United States Patent [19]
Pierce

[11] Patent Number: 5,116,075
[45] Date of Patent: May 26, 1992

[54] TRAILING ARM SUSPENSION WITH WRAPPER COMPRESSION AXLE MOUNTING

[75] Inventor: William C. Pierce, Muskegon, Mich.

[73] Assignee: Lear Siegler Truck Products Corp., Muskegon, Mich.

[21] Appl. No.: 622,723

[22] Filed: Dec. 5, 1990

[51] Int. Cl.⁵ .................................................. B60G 7/00
[52] U.S. Cl. ................................... 280/688; 280/708; 280/713
[58] Field of Search ............... 280/683, 688, 708, 711, 280/712, 713

[56] References Cited

U.S. PATENT DOCUMENTS

| | | | |
|---|---|---|---|
| 3,332,701 | 7/1967 | Masser | 280/713 |
| 3,547,215 | 12/1970 | Bird | 180/71 |
| 3,630,541 | 12/1971 | Carlson et al. | 280/713 |
| 3,707,298 | 12/1972 | Henry et al. | 280/717 |
| 4,261,597 | 4/1981 | Vandenberg | 280/688 |
| 4,371,190 | 2/1983 | Vandenberg | 280/705 |
| 4,595,216 | 6/1986 | Ware | 280/661 |
| 4,615,539 | 10/1986 | Pierce | 280/690 |
| 4,693,486 | 9/1987 | Pierce et al. | 280/80.1 |

*Primary Examiner*—Kenneth R. Rice
*Attorney, Agent, or Firm*—Varnum, Riddering, Schmidt & Howlett

[57] ABSTRACT

A vehicle suspension system for mounting ground-engaging wheels to a vehicle frame where two arms are secured to opposite sides of the frame and a wheel-carrying axle is suspended between the arms. The axle is secured to the arms by a wrapper plate partially surrounding the axle, adapter plates mounted to the interior surface of the wrapper plate and a bolt to compress the wrapper about the axle and the adapter plate against the axle. In this configuration, the wrapper plate supports and strengthens the axle. The wrapper plate generally conforms to the profile of that portion of the axle which it surrounds. The axle can be square, oval, hexagon, octagon, rectangular or D-shaped in cross section. The wrapper plate and the adapter plates exert substantially transverse forces on the axle.

12 Claims, 3 Drawing Sheets

TRAILING ARM SUSPENSION WITH WRAPPER COMPRESSION AXLE MOUNTING

BACKGROUND OF THE INVENTION

1. Technical Field

This invention relates to vehicle suspension systems for mounting ground-engaging wheels to a vehicle frame, and, more particularly, to a trailing arm suspension axle support means for securing a wheel-carrying axle to a vehicle.

2. Description of Related Art

In U.S. Pat. No. 4,693,486 to Pierce, et al. (issued Sept. 15, 1987) a trailing arm suspension has an axle secured to a trailing arm by a wrapper plate partially surrounding the axle, a bolt is utilized to compress the wrapper plate about the axle so that the wrapper plate supports and strengthens the axle, and a circular plug weld attaches the wrapper plate to the axle.

The U.S. Pat. No. 3,547,215 to Bird (issued Dec. 15, 1970) discloses a trailing arm suspension wherein a square axle is typically welded to a bracket which is, in turn, secured to the trailing arm of the vehicle suspension structure. The weldment securing the axle to the bracket is usually made at the mid-point of the side of the axle where vertical bending moment stresses are neutral. However, these areas are areas of high torsional loading which results from brake torque, vehicle roll and diagonal axle (wheel) walk. The welding at the mid-point of the axle may introduce a point of weakness where cracks can initiate. The weakness in the typical axle welded to a bracket is caused, in part, by the undesirable heat-treating effects of the welding process upon the axle material in the localized area adjacent to the weldment. In addition, craters or strike marks may form points at which cracks may initiate or at which stresses may become concentrated.

Axles are typically welded to the brackets in order to securely attach the axle to the bracket under this high loading condition. The axle is welded to the axle bracket by a line weld on either side of the bracket. Because it is a line weld, the weldment has "ends" at which stresses are concentrated and at which cracks may initiate.

The trailing arm suspension system, according to the invention, overcomes the cracking problems of the weld between the axle and the bracket described above in the prior art. The wrapper plate of the suspension system of the invention is fixedly attached to the axle through mechanical means without welding of the axle. This mechanical attachment results in an axle support assembly which is easily fixedly attached to the axle and avoids the above-described failures between the axle and bracket.

SUMMARY OF THE INVENTION

The invention relates to a vehicle suspension system for mounting ground-engaging wheels to a vehicle frame. The suspension system comprises at least two substantially rigid arms secured to opposite sides of the frame. The arms are secured through substantially aligned pivot mounts. At least one wheel-carrying axle is mounted to the arms. A wrapper plate having an elongated planar complementary surface wraps around the axle at least 180°. Depending opposite sides of the wrapper plate extend beyond the axle. Compressing means for diametrically compressing the axle draw the opposite sides of the wrapper plate toward each other. A transverse compression means imparts a second diametrical compression force on the axle in a direction substantially transverse to the first compression force exerted on the axle from the wrapper plate. The wrapper plate and transverse compression means grip, support and strengthen the wheel carrying axle at a point at which the axle is connected to the rigid arms.

In one embodiment of the invention, at least one adapter plate is fixedly attached to the wrapper plate which is in contact with the axle such that a portion of the compressive force exerted by the wrapper plate on the axle is translated into a substantially transverse compression force on the axle by the adapter plate.

In another embodiment, at least one bolt extends through the opposites sides of the wrapper plate. The bolt is adapted to diametrically compress the axle by drawing the opposite sides of the wrapper plate toward each other.

In another embodiment, adapter plates are substantially U-shaped in cross-section. Preferably, the top surface of the leg portions of the U-shaped adapter plates contact the axle and surround the bolt on three sides. One adapter plate is preferably mounted on each opposing internal face of the wrapper plate.

In a further embodiment, the second transverse compressive force is normal to the first compressive force.

In a further embodiment, the vehicle suspension system incorporates at least one locating block. This block is mounted on the axle adjacent to the wrapper plate. The locating block prevents lateral movement of the wrapper plate along the axle if the compression force of the wrapper plate on the axle is insufficient to prevent lateral movement thereof.

In a further embodiment, a vehicle suspension system for mounting ground-engaging wheels to a vehicle frame comprises at least two substantially rigid arms secured to opposite sides of the frame through substantially aligned pivot mounts. At least one wheel-carrying axle is mounted to the arms through a wrapper plate having an elongated planar complementary surface wrapping at least 180° around the axle. The wrapper plate has depending opposite sides extending beyond the axle. A bolt diametrically compresses the axle by drawing the opposite sides of the wrapper plate toward each other. A transverse compression member associated with the bolt imparts a second diametrical compression force on the axle in a direction substantially transverse to a first diametrical compression force from the wrapper plate on the axle and imparted by the wrapper plate. The wrapper and transverse compression member grip, support and strengthen the wheel-carrying axle at the point in which the axle is connected to the rigid arms.

The invention also encompasses a method for mounting an axle support assembly on an axle for ground-engaging wheels comprises the steps of inserting the axle snugly in the elongated planar complementary surface of the wrapper plate. Next, the bolts are inserted in the opposite sides of the wrapper plate. The bolts are tightened until the wrapper plate makes contact with the opposite sides of the axle. Next, the adapter plate is fixedly attached to the internal surface of the wrapper plate by suitable means at a point adjacent to the bolt such that one surface of the adapter plate is in contact with the axle. Finally, a first diametric compression force is created by the wrapper plate on the axle and a second diametric compression force substantially transverse to the first force is created by tightening the bolt. The first diametric compression force exerted by the wrapper plate and the second substantially transverse diametric compression force exerted by the adapter plate on the axle grip, support and strengthen the axle at a point at which the axle is connected to a rigid arm. In one embodiment of the method for mounting the axle support assembly on the axle, the adapter plate is welded to the wrapper plate.

BRIEF DESCRIPTION OF THE DRAWINGS

The invention will now be described in detail with reference to the accompanying drawings wherein.

DESCRIPTION OF THE PREFERRED EMBODIMENT

Figure 1:
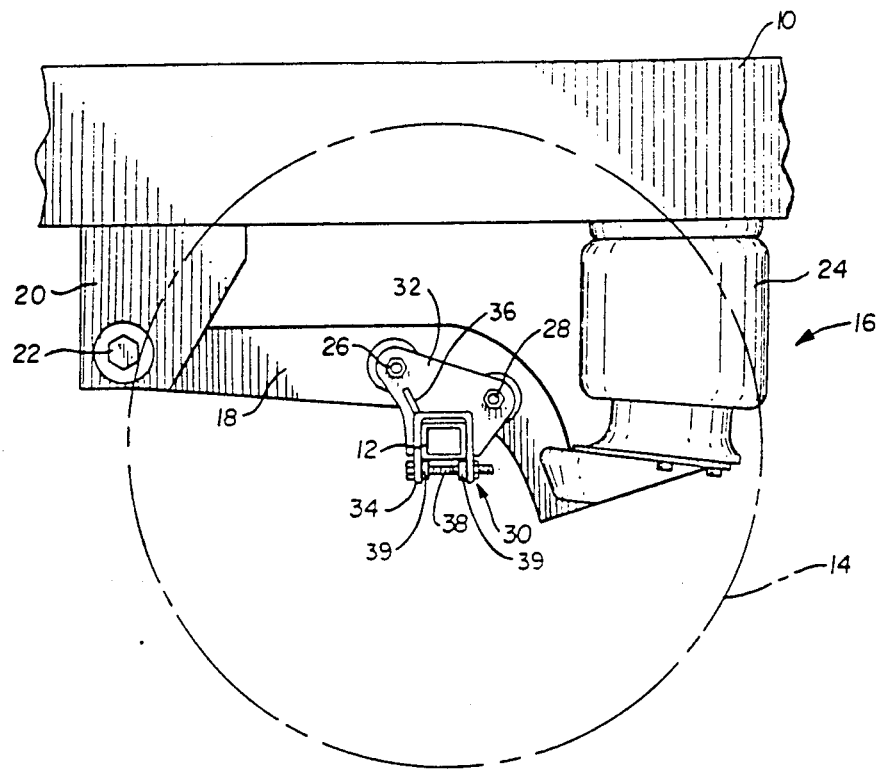
FIG. 1 is a fragmentary, side elevational view of a vehicle frame having mounted thereon a suspension system according to the invention.

Referring to the drawings and to FIG. 1 in particular, a vehicle frame 10 has an axle 12 and ground-engaging wheels 14 (shown in phantom lines) suspended therefrom by a suspension system 16 according to the invention. The front of the vehicle is to the left of the frame as viewed in FIG. 1. Suspension system 16 includes, at each side of the vehicle frame 10, a trailing arm 18 pivotally mounted to a hanger bracket 20 depending from frame 10. The hanger 20 has a pivot pin 22 at the lower end thereof for pivotably supporting the forward end of trailing arm 18. Trailing arm 18 comprises a hollow rectangular member for supporting the axle 12. The forward end of trailing arm 18 is pivotably mounted at pivot pin 22. The trailing arm 18 extends rearward along the vehicle frame 10. The rear end of the trailing arm 18 is secured to an air spring 24. Trailing arm 18 has a slight downward bend intermediate its forward and rear ends. A forward bushed pin 26 and a rear bushed pin 28 extend through trailing arm 18 near the slight downward bend therein for supporting an axle support assembly 30 while permitting limited articulation between the axle support assembly 30 and the trailing arm 18. The upper portion of the air spring 24 is fixedly secured to the vehicle frame 10.

In operation, vertical movement of the ground-engaging wheels 14 is translated through axle 12 to the axle support assembly 30. Vertical movement of axle support assembly 30 is translated to trailing arm 18 through forward bushed pin 26 and rear bushed pin 28. A bushing 29 encases bushed pins 26, 28. The limited articulation permitted between axle support assembly 30 and trailing arm 18 by the bushing 29 of forward bushed pin 26 and rear bushed pin 28 cushions the vertical movement of the trailing arm 18 and controls the roll rate of the suspension by permitting axle support assembly 30 to make small vertical and conical displacements relative to trailing arm 18.

Significant vertical displacement of axle support assembly 30 causes the vertical displacement of trailing arm 18. Vertical movement of trailing arm 18 is permitted by the pivotal connection of the forward end of trailing arm 18 at the pivot pin 22. The vertical movement of trailing arm 18 is cushioned and restrained by air spring 24 and a shock absorber (not shown).

The axle support assembly 30 comprises a pair of side plates 32 disposed on either side of trailing arm 18, a U-shaped wrapper plate 34 depending from the side plates 32, a reinforcing plate 36, a bolt 38 and adapter plates 39. The bolt 38 passes through the end of the U-shaped wrapper plate 34 for compressing the sides of the wrapper plate 34.

Each side plate 32 comprises a vertical plate having openings at the upper portion thereof to receive forward bushed pin 26 and rear bushed pin 28. The forward bushed pin 26 and rear bushed pin 28 extend through trailing arm 18 and through corresponding openings in the pair of side plates 32 disposed on either side of trailing arm 18 to secure side plates 32 to trailing arm 18 thereby supporting the axle support assembly 30 while permitting limited articulation between the side plates 32 and trailing arm 18. In addition, each side plate 32 has a U-shaped opening adapted at the lower portion thereof to receive in complimentary fashion the bight portion of U-shaped wrapper plate 34. The side plate 32 thereby acts to both provide a surface to which wrapper plate 34 may be secured as by welding and also acts to reinforce wrapper plate 34.

Figure 2:
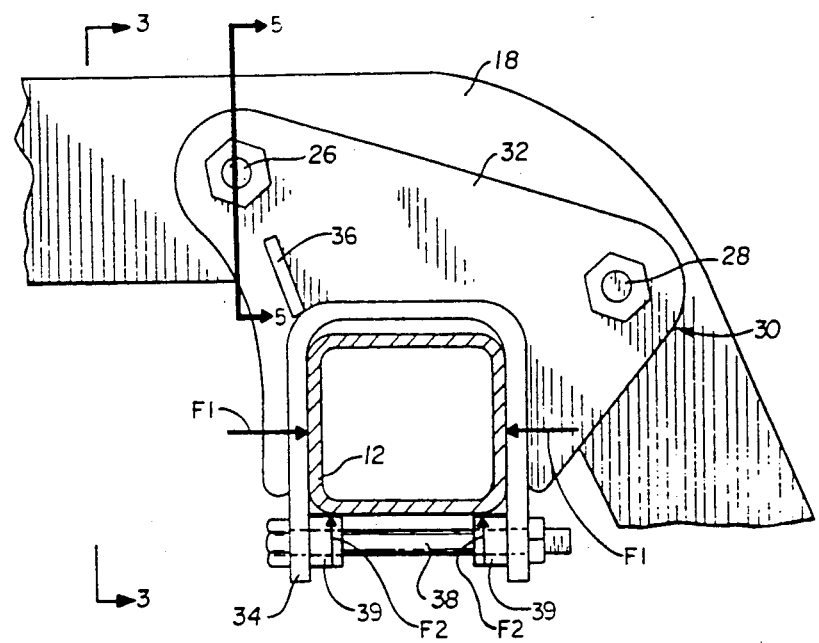
FIG. 2 is an enlarged, fragmentary side sectional view of the suspension shown in FIG. 1.
Figure 3:
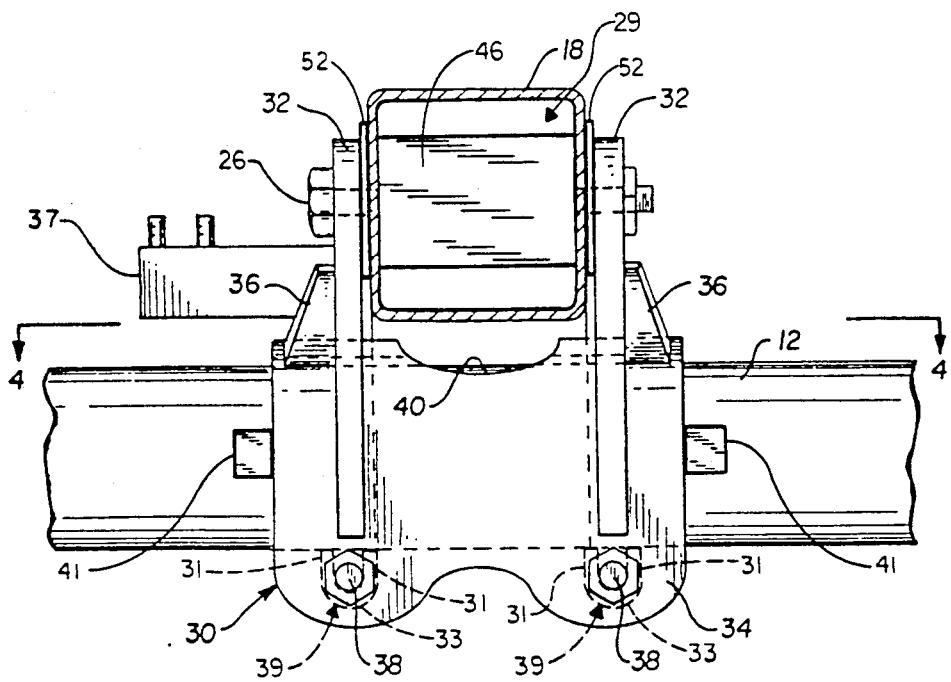
FIG. 3 is a sectional view taken along line 3—3 in FIG. 2.

Wrapper plate 34, as seen in FIG. 3, is a saddle-shaped plate. As seen in FIG. 2, the wrapper plate 34 is a of U-shaped cross-section. The bight portion of the wrapper plate 34 is disposed upwardly within side plates 32 and the open end of wrapper plate 34 extends downwardly. Wrapepr plate 34 is secured to side plates 32 by suitable means such as welding. Wrapper plate 34 is shaped to snugly receive the axle 12 having a square, rectangular or other non-circular cross sectional configuration with a small space between the upper surface of the axle and the inside surface of the wrapper plate 34. As can be seen in FIG. 3, wrapper plate 34 has an aperture 40 in the bight portion of the U-shaped wrapper plate 34 to reduce the overall weight of the axle support assembly 30, to increase the flexibility of the wrapper plate 34 and to provide trailing arm clearance.

Wrapper plate 34 includes bolts 38 extending through the sides of the U-shaped wrapper plate 34. When assembled, the bolts 38 are positioned beneath the axle 12 and are adapted to place the side of the U-shaped wrapper plate 34 in compression against the axle 12 when the bolts 38 are tightened. Adapter plates 39 are incorporated to enhance the gripping effect of the wrapper plate 34 on the axle 12. The adapter plates 39 are fixedly attached to the interior surface of wrapper plate 34 at a point just below the opening in wrapper plate 34 for bolts 38. The adapter plates 39 are U-shaped in cross section with two upstanding leg portions 31 and a bight portion 33. The adapter plates 39 are mounted such that the upper surface of the two upstanding leg portions 31 contact the lower surface of the axle 12.

Axle support assembly 30 also includes a reinforcing plate 36 secured as by welding to side plate 32 and wrapper plate 34 for supporting and reinforcing wrapper plate 34. A shock absorber bracket 37 is provided at the inner side plate 32 for securing a lower portion of a shock absorber (not shown) to dampen oscillations of the axle 12. Although the axle support assembly 30 is described in the preferred embodiment as a plurality of plates fixedly attached to one another by suitable means such as welding, it can also be easily understood that a single axle support assembly could be created by other forming means such as casting.

Figure 5:
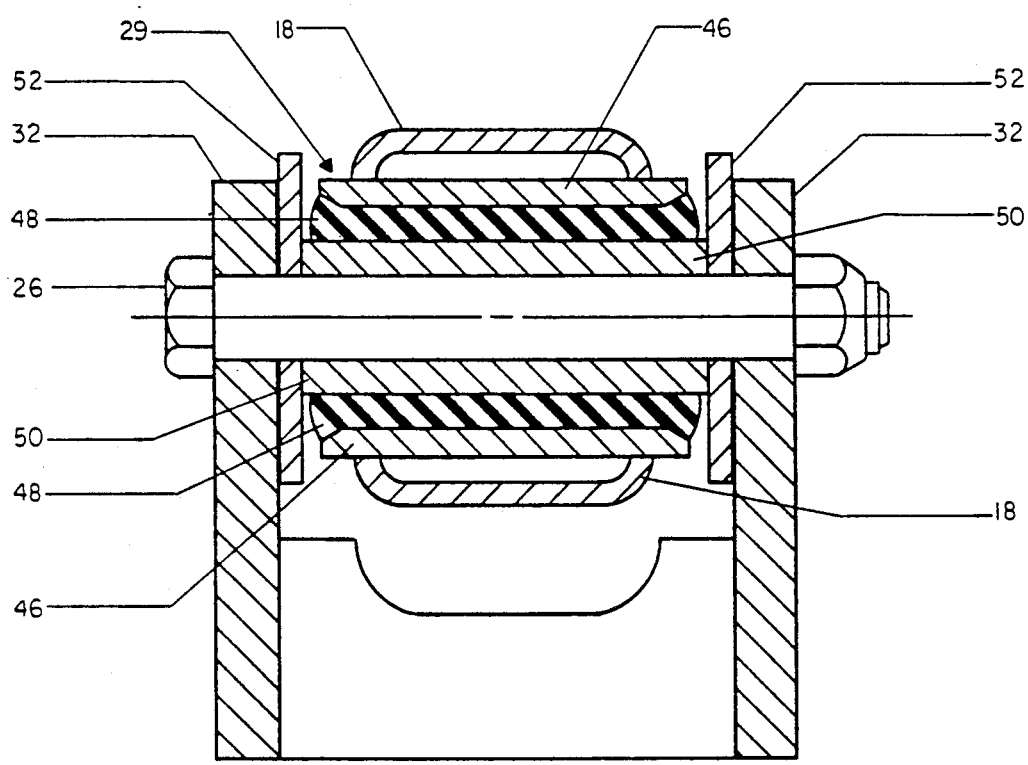
FIG. 5 is a partial sectional view taken along line 5—5 in FIG. 2.

As seen in FIG. 5, the bushing 29 comprises an outer shell or tube 46, a elastomer coating 48 and an inner core 50. Preferably, the outer tube 46 and inner core 50 are constructed of steel and the elastomer coating 48 is a flexible material. The outer tube 46 is inserted into an appropriate opening (not shown) in trailing arm 18 and fixedly attached thereto by suitable means such as welding. The outer tube 46 is preferably circular in cross-section but may be any suitable cross-section. The elastomer coating 48 is adhered directly to the outer surface of the inner core 50 such that the entire length of the inner core 50 is covered by the coating 48. The inner core 50 and elastomer coating 48 are inserted into the outer tube 46. Thereafter, bolt 26 is inserted through appropriate openings (not shown) in side plates 32, through a pair of washers 52 and through the inner bushing core 50. The washers 52 are mounted between the inner surface of side plates 32 and the ends of the inner core 50. The bolt 26 is tightened such that a compressive force is exerted on the side plates, inner core 50 and washers 52.

In operation, the axle 12 is secured within the wrapper plate 34 by first inserting the axle 12 into the U-shaped complementary wrapper plate 34 and then clamping the axle 12 forcibly into wrapper plate 34. Bolt 38 is tightened until the wrapper plate 34 is snug against axle 12. Then, the adapter plates 39 are fixedly attached as by welding to the interior surface of the wrapper plate 34 such that the upstanding leg portions 31 contact the lower surface of the axle 12. With the adapter plates 39 securely in place, the bolt 38 is further tightened to create compressive forces on the axle 12.

As the bolt 38 is tightened, as shown in FIG. 2, the sides of the wrapper plates exert a first diametric compressive force on the complementary sides of the axle 12 in the direction of arrow F1. The tightening of bolt 38 also causes the depending ends of the U-shaped wrapper plate 34 to bend or flex inward. This inward bending results in a slight rotation of the bottom of the wrapper plate about the bottom corners of the axle 12 to introduce a vertical component of movement into the bottom end of the wrapper plate 34. This inward bending of wrapper plate 34 at the ends thereof results in the application of a vertical component of force F2, on axle 12 by adapter plates 39. Thus, the horizontal force on the ends of the U-shaped wrapper plate 34 is translated into a second compressive force F2, which is transverse to the first force F1. The transverse compression force F2 exerted by the adapter plates 39 on the axle along with the compression force F1 exerted along the internal faces of wrapper plate 34 provide sufficient gripping strength for the axle support assembly 30 on the axle 12, and strengthens the axle against torsional stresses and bending stresses.

Figure 4:
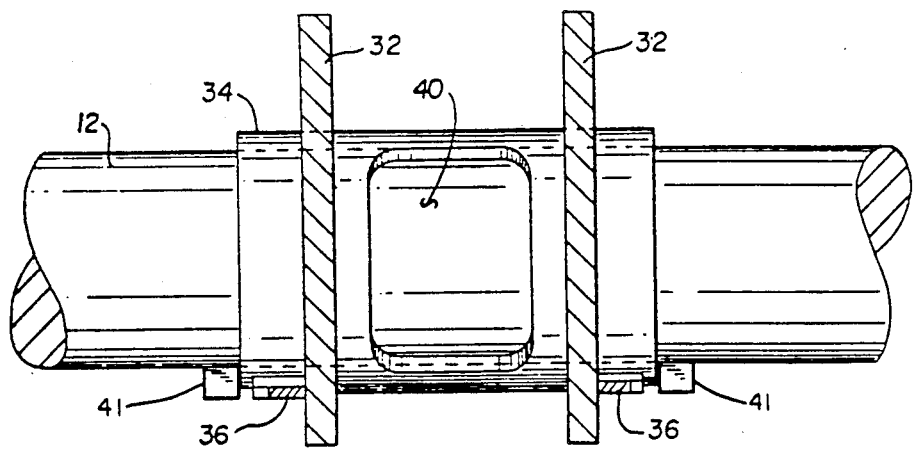
FIG. 4 is a sectional view taken along line 4—4 in FIG. 3.

The suspension system can be further modified by fixedly attaching locating blocks 41 to the axle 12 on each side of the support assembly 30. The locating blocks 41 serve to prevent lateral movement of the axle support assembly 30 along the axle 12 if the bolt 38 of the axle support assembly 30 is not properly tightened during installation or maintained to ensure the proper torque. If the bolt 30 were to become loose so that the axle support assembly 30 could move laterally along the axle 12, it might interfere with the rotation of the wheel 14 and possibly cause failure of the wheel. By fixedly attaching locating blocks 41 to the axle 12 by suitable means such as welding, such lateral movement of the axle support assembly can be prevented. As seen in FIGS. 3 and 4, locating blocks 41 may be mounted immediately adjacent to the sides of wrapper plate 34.

While the preferred embodiment discussed above describes an axle support assembly for a square axle, the invention may be modified to support D-shaped, oval, hexagon, octagon, and rectangular axles merely by modifying the configuration of the wrapper plate 34 to conform the cross-section of the axle.

The mechanical assembly of the axle support assembly according to the invention overcomes the potential cracking problems which can result from axle welding operations used in the prior suspension systems. Even without the axle weld, the axle support assembly according to the invention securely attaches the axle support assembly to the axle. Another distinct advantage of the axle support assembly according to the invention is the relative ease of installation compared to the more complex and more difficult welding operations found in prior suspensions.

While particular embodiments of the invention have been shown, it will be understood that the invention is not limited thereto and reasonable modifications and variations are possible without departing from the spirit of the invention.

The embodiments of the invention in which an exclusive property or privilege is claimed are defined as follows:

1. In a vehicle suspension for mounting ground-engaging wheels to a vehicle frame, the suspension system comprising at least two substantially rigid arms secured to opposite sides of the frame through substantially aligned pivot mounts; at least one wheel-carrying axle mounted to said arm through a wrapper plate having an elongated planar complementary surface wrapping at least 180° around said axle and depending opposites sides extending beyond said axle; and compressing means for diametrically compressing said axle by drawing said opposite sides of said wrapper plate toward each other; the improvement comprising;
a transverse compression means for imparting a second diametrical compression force on said axle in a direction substantially transverse to a first diametrical compression force from said wrapper plate on said axle and imparted by said compression means; whereby said wrapper plate and transverse compression means grip, support and strengthen said wheel carrying axle at the point at which said axle is connected to said rigid arms.

2. A vehicle suspension system according to claim 1 wherein said transverse compression means comprises at least one adapter plate fixedly attached to said wrapper plate which is in contact with the axle such that a portion of the compressive force exerted by the wrapper plate on the axle is translated into a substantially transverse compression force on the axle by said adapter plate.

3. A vehicle suspension system according to claim 2 wherein said transverse compression means further comprises at least one bolt which extends through said opposite sides of said wrapper plate and is adapted to diametrically compress said axle by drawing said opposite sides of said wrapper plate toward each other.

4. A vehicle suspension system according to claim 3 wherein said adapter plate is substantially U-shaped in cross-section.

5. A vehicle suspension system according to claim 4 wherein the top surface of the leg portions of the U-shaped adapter plates contact the axle and surround said bolt on three sides.

6. A vehicle suspension system according to claim 5 wherein one adapter plate is mounted on each opposing internal face of the wrapper plate.

7. A vehicle suspension system according to claim 2 wherein one adapter plate is mounted on opposing internal faces of said wrapper plate.

8. A vehicle suspension system according to claim 1 wherein said second substantially transverse compressive force is normal to said first compression force from said wrapper plate on said axle imparted by said compression means.

9. A vehicle suspension system according to claim 1 and further comprising at least one locating block mounted on said axle adjacent to said wrapper plate to prevent lateral movement of the wrapper plate along the axle if the compression force of the wrapper plate on the axle is insufficient to prevent lateral movement thereof.

10. A method for mounting an axle support assembly on an axle for ground-engaging wheels comprising the steps of;
    inserting an axle in an elongated planar complementary surface of a wrapper plate;
    inserting a bolt in opposite sides of said wrapper plate;
    tightening said bolt until said wrapper plate makes contact with the opposite sides of the axle;
    fixedly attaching an adapter plate to an internal surface of said wrapper plate at a point adjacent to the bolt such that one surface of said adapter plate is in contact with the axle; and
    tightening the bolt to create a first diametric compression force on the axle by the wrapper plate and a second compression force substantially transverse to said first force by the adapter plate on the axle;
    whereby the first diametric compression force exerted by said wrapper plate and the second substantially transverse diametric compression force exerted by said adapter plate on said axle, support and strengthen said axle at a point at which said axle is connected to a rigid arm.

11. A method for mounting an axle support assembly on an axle for ground-engaging wheels according to claim 10 and wherein the fixedly attaching step comprises welding the adapter plate to the wrapper plate.

12. In a vehicle suspension for mounting ground-engaging wheels to a vehicle frame, the suspension system comprising at least two substantially rigid arms secured to opposite sides of the frame through substantially aligned pivot mounts; at least one wheel-carrying axle mounted to said arms through a wrapper plate having an elongated planar complementary surface wrapping at least 180° around said axle and depending opposites sides extending beyond said axle; and a bolt for diametrically compressing said axle by drawing said opposite sides of said wrapper plate toward each other; the improvement comprising;
    a transverse compression member associated with said bolt for imparting a second diametrical compression force on said axle in a direction substantially transverse to a first diametrical compression force from said wrapper plate on said axle and imparted by said wrapper plate;
    whereby said wrapper plate and transverse compression member grip, support and strengthen said wheel carrying axle at the point at which said axle is connected to said rigid arms.

* * * * *